(12) United States Patent
Li et al.

(10) Patent No.: US 10,008,944 B2
(45) Date of Patent: Jun. 26, 2018

(54) CONTROL METHOD AND CONTROL CIRCUIT FOR SWITCHING POWER SUPPLY

(71) Applicant: Suzhou Poweron IC Design Co., Ltd., Suzhou, Jiangsu Province (CN)

(72) Inventors: Haisong Li, Jiangsu (CN); Yangbo Yi, Jiangsu (CN); Changshen Zhao, Jiangsu (CN); Wenliang Liu, Jiangsu (CN)

(73) Assignee: Suzhou Poweron IC Design Co., Ltd. (CN)

( * ) Notice: Subject to any disclaimer, the term of this patent is extended or adjusted under 35 U.S.C. 154(b) by 0 days. days.

(21) Appl. No.: 15/428,761

(22) Filed: Feb. 9, 2017

(65) Prior Publication Data

US 2018/0054128 A1   Feb. 22, 2018

(30) Foreign Application Priority Data

Aug. 19, 2016 (CN) .......................... 2016 1 0686344

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 2001/0009* (2013.01)

(58) Field of Classification Search
CPC ............ H02M 3/335; H02M 3/33569; H02M 3/33507; H02M 3/33538; H02M 3/33546; H02M 3/33553; H02M 3/33523; H02M 3/315; H02M 7/537; H02M 7/538466; H02M 7/53862; H02M 7/757
USPC .. 363/20, 21.01, 21.04, 21.07, 21.12, 21.15, 363/95, 97, 131
See application file for complete search history.

(56) References Cited

U.S. PATENT DOCUMENTS

| | | | |
|---|---|---|---|
| 9,431,892 B1 * | 8/2016 | Li .......................... | H02M 1/36 |
| 9,800,164 B1 * | 10/2017 | Li ...................... | H02M 3/33515 |
| 2010/0110732 A1 * | 5/2010 | Moyer .............. | H02M 3/33592 363/19 |
| 2014/0160810 A1 * | 6/2014 | Zheng ............... | H02M 3/33576 363/21.17 |

(Continued)

*Primary Examiner* — Adolf Berhane
(74) *Attorney, Agent, or Firm* — Colin P. Cahoon; James H. Ortega; Carstens & Cahoon, LLP (57) ABSTRACT

Disclosed are a control method and a control circuit for a switching power supply, said switching power supply comprises a secondary side controller and a secondary side MOS transistor connected between a load and a secondary side winding of a transformer. The present invention is used for detecting a working state of the secondary side winding of a transformer and a type of a communication signal transmitted by a load, and for generating a switching pulse signal VG in a Reset Time interval of an on/off cycle according to the type of the communication signal; the primary side controller detects a variation amplitude of the transiently varied signal of the voltage drop at the pin feedback (FB) in the Reset Time interval; if the variation amplitude of the transiently varied signal is greater than a pre-set value ΔVref, the primary side controller judges that the signal is a communication signal, and records the communication signal.

12 Claims, 6 Drawing Sheets

(56) References Cited

U.S. PATENT DOCUMENTS

| | | | |
|---|---|---|---|
| 2014/0204619 A1* | 7/2014 | Telefus | H02M 3/33523 363/21.01 |
| 2015/0188442 A1* | 7/2015 | Kesterson | H02M 3/33523 363/21.15 |
| 2015/0207420 A1* | 7/2015 | Wang | H02M 3/33507 363/21.12 |
| 2015/0280573 A1* | 10/2015 | Gong | H02M 3/33523 363/21.14 |
| 2016/0111961 A1* | 4/2016 | Balakrishnan | H02M 3/33507 363/21.12 |
| 2016/0190938 A1* | 6/2016 | Wang | H02M 3/33507 363/21.12 |
| 2017/0117812 A1* | 4/2017 | Furtner | H02M 3/33515 |
| 2017/0244332 A1* | 8/2017 | Leong | H02M 3/33523 |

* cited by examiner

CONTROL METHOD AND CONTROL CIRCUIT FOR SWITCHING POWER SUPPLY

CROSS REFERENCE TO RELATED APPLICATIONS

This application claims the benefit of the priority of Chinese Patent Application No. 201610686344.1, filed on Aug. 19, 2016, entitled "Control Method for Switching Power Supply", the entire contents of which are incorporated herein by reference.

TECHNICAL FIELD

The present invention relates to improvements on a control method and a control circuit for a switching power supply, and belongs to the technical field of switching power supply.

BACKGROUND OF THE INVENTION

Figure 1:
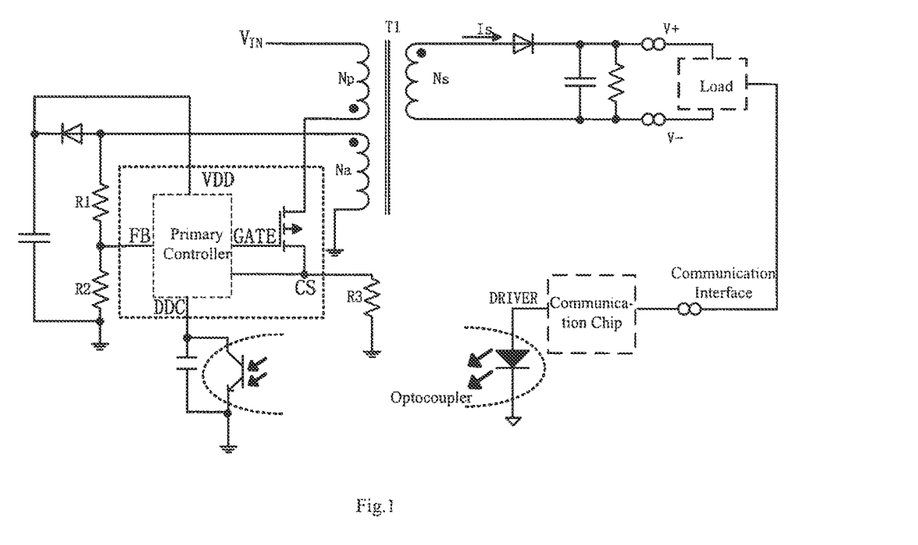
FIG. 1 is a structural schematic diagram of a switching power supply in the prior art.

The switching power supply has advantages of small volume, high efficiency, and large current, and is widely applied in a mobile phone charger, an adapter and so on. At present, the switching power supply realizes communication between the primary side and the secondary side of the transformer through two kinds of messaging modes. One messaging mode is shown in FIG. 1. The system comprises a primary controller, a transformer, a power switch, a communication chip, an optical coupler, a load, a CS sampling loop connected with the primary controller, a DC output stage connected with the secondary side of the transformer, a VDD power supplying loop connected with an auxiliary coil of the transformer and a feedback loop FB. The system realizes communication between the primary side and the secondary side of the transformer by the following working principle: when the communication chip receives a communication enabling signal from the load, the communication chip drives the optical coupler to transmit the signal to the pin DDC (Digital Date Communication) of the primary controller. The primary controller records the signal at the pin DDC, and actuates corresponding actions according to the signal, thereby realizing communication. Although the communication between the secondary side and the primary side of the transformer can be realized in this way, the optical coupler or other devices for communicating should be provided additionally, thereby increasing the cost of the system. Additionally, an extra port for the primary controller of the primary feedback should be configured to receive the communication signal.

Figure 2:
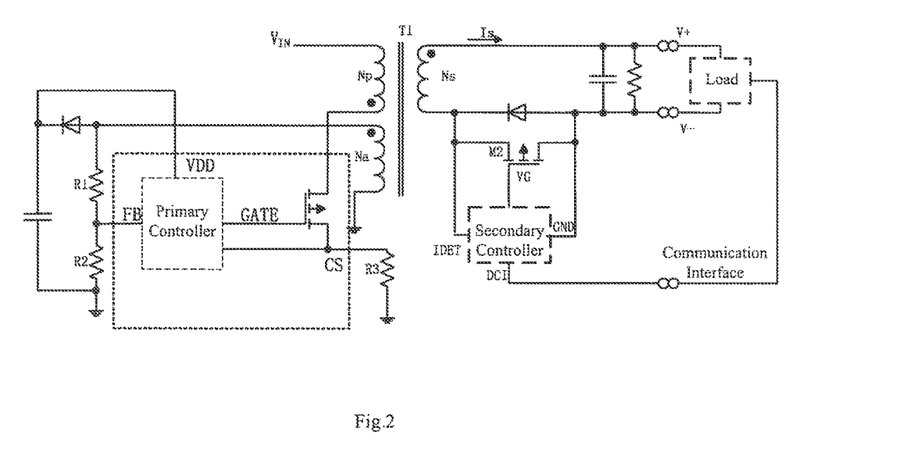
FIG. 2 is a structural schematic diagram of another switching power supply in the prior art.
Figure 3:
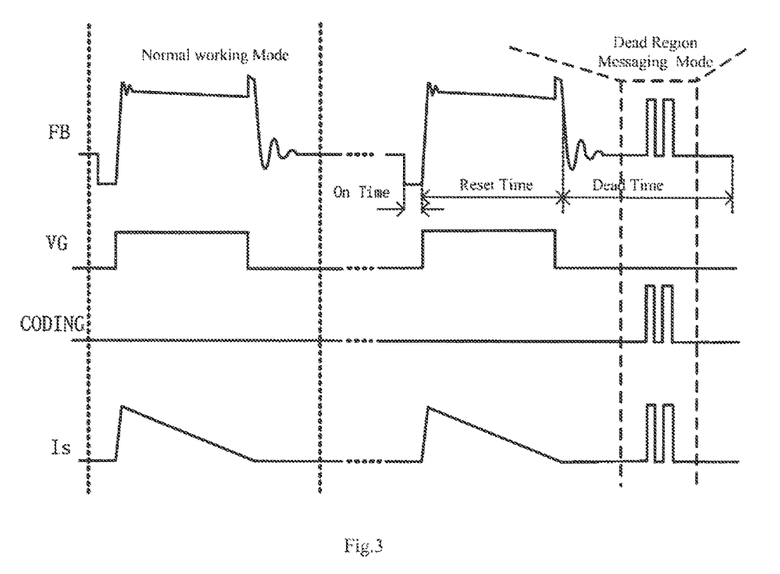
FIG. 3 shows waveforms in a messaging mode in the prior art of FIG. 2.

As shown in FIG. 2, another implementation of the system comprises a primary controller, a transformer, a power switch, a secondary controller, a load, a CS sampling loop connected with the primary controller, a DC output stage connected with the secondary side of the transformer, a VDD power supplying loop connected with an auxiliary coil of the transformer, and a feedback loop FB. The system realizes communication between the primary side and the secondary side of the transformer by the following working principle: when the secondary controller detects the communication signal output from the load and compiles a switching pulse signal VG in the dead time according to the content of the communication signal. The switching pulse signal causes the system to oscillate, and the oscillation is fed back to the pin FB of the primary controller through the secondary winding and the auxiliary winding. The primary controller monitors the oscillation signal at the pin FB and actuates corresponding actions according to the content of the signal. FIG. 3 shows waveforms of the communication in the dead time. The communication between the primary side and the secondary side of the transformer can be realized in this way, and no additional devices are required, but the communication is implemented in the dead time, which requires that the primary controller works in DCM. What's more, in the dead time, the secondary diode of the switch is apt to cause oscillation between the inductor of the transformer and the primary parasitic capacitance, which is unfavorable for the primary controller to identify the communication signal.

SUMMARY OF THE INVENTION

In order to overcome the defects in the prior art, the present invention provides a control method and a control circuit for a switching power supply, which can realize the communication between the secondary side and the primary side of the switching power supply. The switching of the secondary MOS causes no oscillations of the primary side, and no extra devices are required. The method solves the problem that the working mode of the primary controller is limited.

The present invention is realized by the following technical schemes: a control method for switching power supply, said switching power supply comprises a primary controller, a load, and a transformer, and a secondary controller and a secondary MOS M2 are connected between the load and a secondary winding of the transformer; the method comprising:

at a side of the secondary winding of the transformer, detecting, by the secondary controller, a working state of the secondary winding of the transformer and a type of a communication signal transmitted by the load in real time, and generating a switching pulse signal VG in a Reset Time of an on/off cycle according to the type of the communication signal; during the Reset Time of an on/off cycle, controlling, by the switching pulse signal VG, to turn on or turn off the secondary MOS M2, and forcing a drain-to-source voltage drop of the secondary MOS M2 to vary transiently; through an auxiliary winding of the transformer, coupling transiently varied signals of the voltage drop to a pin FB of the primary controller; and at a side of a primary winding and an auxiliary winding of the transformer, detecting, by the primary controller, a variation amplitude of the transiently varied signal of the voltage drop at the pin FB in the Reset Time; if the variation amplitude of the transiently varied signal is greater than a pre-set value ΔVref, it is judged by the primary controller that the signal is a communication signal, and the communication signal is recorded, and a corresponding action according to information of the communication signal is actuated.

In some of the embodiments, the secondary controller comprises a voltage/current detecting module, a control unit & PWM module, a communication module, and a Driver; the voltage/current detecting module is electrically connected with an input port IDET, the control unit & PWM module, and the communication module respectively; the control unit & PWM module is electrically connected with the communication module; the communication module is electrically connected with an input port DCI and the Driver; the Driver is electrically connected with an output port VG;

wherein the communication module detects a communication signal at the port DCI and a working state signal DATE of the secondary controller; when one and only one of two input signals is active, the communication module generates a corresponding serial code according to the input signal, and compiles the switching pulse signal VG in the Reset time; the serial code is transmitted to the pin FB of the primary controller over one or more cycles.

In some of the embodiments, the communication module comprises a multiplexer MUX2-1, an encoding circuit, and an AND gate AND4 configured to perform an AND operation for an output of the encoding circuit and a PWM signal; the multiplexer MUX2-1 is electrically connected with the input signal at the port DCI, the input signal DATE, and the encoding circuit respectively; the encoding circuit is electrically connected with the AND gate AND4 and the input PWM signal respectively; the AND gate AND4 is electrically connected with the input PWM signal and the switching pulse signal VG respectively; in each Reset time, the compiled switching pulse signal VG has only one state: a low level or a high level; when the switching pulse signal VG is a low level, the secondary MOS M2 is turned off; when the secondary winding is demagnetized, a body diode of the secondary MOS M2 is forwardly biased and turned on; when the switching pulse signal VG is a high level, the secondary MOS M2 is turned on; when the secondary winding is demagnetized, a channel of the secondary MOS M2 is turned on; the drain-to-source voltage drop of the secondary MOS M2 is forced to vary transiently by turning on or turning off the secondary MOS M2 in the Reset Time.

In some of the embodiments, the communication module comprises a multiplexer MUX2-1, an encoding circuit, a delay unit DELAY2, an AND gate AND5 configured to perform an AND operation for an output of the encoding circuit and a PWM signal, and an AND gate AND6 configured to perform an AND operation for an output of the delay unit DELAY2 and the PWM signal; the multiplexer MUX2-1 is electrically connected with the input signal at the port DCI, the input signal DATE, and the encoding circuit respectively; the encoding circuit is electrically connected with the AND gate AND5 and the AND gate AND6 respectively; the AND gate AND5 is electrically connected with the switching pulse signal VG and the input PWM signal respectively; the delay unit DELAY2 is electrically connected with an input signal CTRL and the AND gate AND6; the AND gate AND6 is electrically connected with the input PWM signal; in each Reset time, the compiled switching pulse signal VG comprises multiple states: a low level and a high level; when the switching pulse signal VG is a low level, the secondary MOS M2 is turned off; when the secondary winding is demagnetized, a body diode of the secondary MOS M2 is forwardly biased and turned on; when the switching pulse signal VG is a high level, the secondary MOS M2 is turned on; when the secondary winding is demagnetized, a channel of the secondary MOS M2 is turned on; the drain-to-source voltage drop of the secondary MOS M2 is forced to vary transiently by turning on or turning off the secondary MOS M2 in the Reset Time.

In some of the embodiments, the primary controller comprises a voltage detecting module, a controller, a PWM module, a current detecting module, and a communication detecting module; the communication detecting module is electrically connected with the pin FB, the voltage detecting module, and the controller respectively; the voltage detecting module is electrically connected with the controller and the pin FB respectively; the current detecting module is electrically connected with the controller and the input port CS respectively; the PWM module is electrically connected with the controller and the output port GATE; in the Reset time, the communication detecting module detects the variation amplitude of the transiently varied signal at the pin FB between two adjacent on/off cycles; when the variation amplitude of the transiently varied signal at the pin FB is greater than or equals to the pre-set value ΔVref, the communication detecting module sets an output signal CODING to be a high level; when the variation amplitude of the transiently varied signal is less than the pre-set value ΔVref, the communication detecting module sets the output signal CODING to be a low level; and the output signal CODING corresponds with the switching pulse signal VG so as to realize communication between a primary side and a secondary side.

In some of the embodiments, the communication detecting module comprises a sample-and-hold module S/H, an adder ADD1, a comparator, a first trigger DFF1, a second trigger DFF2, a delay unit DELAY1, and an AND gate AND1 configured to perform an AND operation for a Sample signal and an output signal of the delay unit DELAY1; the sample-and-hold module S/H is electrically connected with the adder ADD1, the AND gate AND1, and the input pin FB respectively; the adder ADD1 is electrically connected with the comparator and the pre-set threshold reference ΔVref; the comparator is electrically connected with the input pin FB, the first trigger DFF1, and the second trigger DFF2 respectively; the first trigger DFF1 is electrically connected with an input signal FB_CHECK and the delay unit DELAY1 respectively; the trigger DFF2 is electrically connected with the input signal FB_CHECK and an output signal CODING respectively.

In some of the embodiments, the communication detecting module comprises a sample-and-hold module S/H, an adder ADD2, a comparator, an AND gate AND2 configured to perform an AND operation for an output signal of the comparator and a logic signal FB_CHECK, a counter, an AND gate AND3 configured to perform an AND operation for the output signal of the comparator and the output logical signal of the counter; the sample-and-hold module S/H is electrically connected with the adder ADD2, an input signal SAMPLE, and the input pin FB respectively; the adder ADD1 is electrically connected with the comparator and the pre-set threshold reference ΔVref respectively; the comparator is electrically connected with the input pin FB, an input end of the AND gate AND2 and an input end of the AND gate AND3 respectively; the AND gate AND2 is electrically connected with the input signal FB_CHECK; the comparator is electrically connected with the AND gate AND2 and the AND gate AND3 respectively; and the AND gate AND3 is electrically connected with an output signal CODING The technical schemes of the control circuit for a switching power supply are as follows: a control circuit for switching power supply, the switching power supply comprises a primary controller, a load, and a transformer; the control circuit comprises a secondary controller and a secondary MOS M2, the secondary controller and the secondary MOS M2 are connected between the load and a secondary winding of the transformer;

wherein at a side of the secondary winding of the transformer, the secondary controller is configured to detect a working state of the secondary winding of the transformer in real time and a type of a communication signal transmitted by the load, and generate a switching pulse signal VG in a Reset Time of an on/off cycle according to the type of the communication signal; during the Reset Time of an on/off cycle, the switching pulse signal VG controls to turn on or turn off the secondary MOS M2, and forces a drain-to-source voltage drop of the secondary MOS M2 varies transiently; through an auxiliary winding of the transformer, transiently varied signals of the voltage drop are coupled to a pin FB of the primary controller;

at a side of a primary winding and an auxiliary winding of the transformer, the primary controller is configured to detect a variation amplitude of the transiently varied signal of the voltage drop at the pin FB in the Reset Time; if the variation amplitude of the transiently varied signal is greater than a pre-set value ΔVref, it is judged by the primary controller that the signal is a communication signal, and the communication signal is recorded, and a corresponding action according to information of the communication signal is actuated.

In some of the embodiments, the secondary controller comprises a voltage/current detecting module, a control unit & PWM module, a communication module, and a Driver; the voltage/current detecting module is electrically connected with an input port IDET, the control unit & PWM module, and the communication module respectively; the control unit & PWM module is electrically connected with the communication module; the communication module is electrically connected with an input port DCI and the Driver; the Driver is electrically connected with an output port VG;

wherein the communication module is configured to detect a communication signal at the port DCI and a working state signal DATE of the secondary controller; when one and only one of two input signals is active, the communication module generates a corresponding serial code according to the input signal, and compiles the switching pulse signal VG in the Reset time; the serial code is transmitted to the pin FB of the primary controller over one or more cycles.

In some of the embodiments, the communication module comprises a multiplexer MUX2-1, an encoding circuit, and an AND gate AND4 configured to perform an AND operation for an output of the encoding circuit and a PWM signal; the multiplexer MUX2-1 is electrically connected with the input signal at the port DCI, the input signal DATE, and the encoding circuit respectively; the encoding circuit is electrically connected with the AND gate AND4 and the input PWM signal respectively; the AND gate AND4 is electrically connected with the input PWM signal and the switching pulse signal VG respectively; in each Reset time, the compiled switching pulse signal VG has only one state: a low level or a high level; when the switching pulse signal VG is a low level, the secondary MOS M2 is turned off; when the secondary winding is demagnetized, a body diode of the secondary MOS M2 is forwardly biased and turned on; when the switching pulse signal VG is a high level, the secondary MOS M2 is turned on; when the secondary winding is demagnetized, a channel of the secondary MOS M2 is turned on; the drain-to-source voltage drop of the secondary MOS M2 is forced to vary transiently by turning on or turning off the secondary MOS M2 in the Reset Time.

In some of the embodiments, the communication module comprises a multiplexer MUX2-1, an encoding circuit, a delay unit DELAY2, an AND gate AND5 configured to perform an AND operation for an output of the encoding circuit and a PWM signal, and an AND gate AND6 configured to perform an AND operation for an output of the delay unit DELAY2 and the PWM signal; the multiplexer MUX2-1 is electrically connected with the input signal at the port DCI, the input signal DATE, and the encoding circuit respectively; the encoding circuit is electrically connected with the AND gate AND5 and the AND gate AND6 respectively; the AND gate AND5 is electrically connected with the switching pulse signal VG and the input PWM signal respectively; the delay unit DELAY2 is electrically connected with an input signal CTRL and the AND gate AND6; the AND gate AND6 is electrically connected with the input PWM signal; in each Reset time, the compiled switching pulse signal VG comprises multiple states: a low level and a high level; when the switching pulse signal VG is a low level, the secondary MOS M2 is turned off; when the secondary winding is demagnetized, a body diode of the secondary MOS M2 is forwardly biased and turned on; when the switching pulse signal VG is a high level, the secondary MOS M2 is turned on; when the secondary winding is demagnetized, a channel of the secondary MOS M2 is turned on; the drain-to-source voltage drop of the secondary MOS M2 is forced to vary transiently by turning on or turning off the secondary MOS M2 in the Reset Time.

In some of the embodiments, the primary controller comprises a voltage detecting module, a controller, a PWM module, a current detecting module, and a communication detecting module; the communication detecting module is electrically connected with the pin FB, the voltage detecting module, and the controller respectively; the voltage detecting module is electrically connected with the controller and the pin FB respectively; the current detecting module is electrically connected with the controller and the input port CS respectively; the PWM module is electrically connected with the controller and the output port GATE; in the Reset time, the communication detecting module detects the variation amplitude of the transiently varied signal at the pin FB between two adjacent on/off cycles; when the variation amplitude of the transiently varied signal at the pin FB is greater than or equals to the pre-set value ΔVref, the communication detecting module sets an output signal CODING to be a high level; when the variation amplitude of the transiently varied signal is less than the pre-set value ΔVref, the communication detecting module sets the output signal CODING to be a low level; and the output signal CODING corresponds with the switching pulse signal VG so as to realize communication between a primary side and a secondary side.

In some of the embodiments, the communication detecting module comprises a sample-and-hold module S/H, an adder ADD1, a comparator, a first trigger DFF1, a second trigger DFF2, a delay unit DELAY1, and an AND gate AND1 configured to perform an AND operation for a Sample signal and an output signal of the delay unit DELAY1; the sample-and-hold module S/H is electrically connected with the adder ADD1, the AND gate AND1, and the input pin FB respectively; the adder ADD1 is electrically connected with the comparator and the pre-set threshold reference ΔVref; the comparator is electrically connected with the input pin FB, the first trigger DFF1, and the second trigger DFF2 respectively; the first trigger DFF1 is electrically connected with an input signal FB_CHECK and the delay unit DELAY1 respectively; the trigger DFF2 is electrically connected with the input signal FB_CHECK and an output signal CODING respectively.

In some of the embodiments, the communication detecting module comprises a sample-and-hold module S/H, an adder ADD2, a comparator, an AND gate AND2 configured to perform an AND operation for an output signal of the comparator and a logic signal FB_CHECK, a counter, an AND gate AND3 configured to perform an AND operation for the output signal of the comparator and the output logical signal of the counter; the sample-and-hold module S/H is electrically connected with the adder ADD2, an input signal SAMPLE, and the input pin FB respectively; the adder ADD1 is electrically connected with the comparator and the pre-set threshold reference ΔVref respectively; the comparator is electrically connected with the input pin FB, an input end of the AND gate AND2 and an input end of the AND gate AND3 respectively; the AND gate AND2 is electrically connected with the input signal FB_CHECK; the comparator is electrically connected with the AND gate AND2 and the AND gate AND3 respectively; and the AND gate AND3 is electrically connected with an output signal CODING.

The technical schemes of the present invention have prominent substantive features and represent notable progresses as follows:

1. The power supply system adopting this kind of control method can effectively realize the communication between the secondary side and the primary side of the transformer; no extra devices are required in the power supply system, so the power supply system is simple;
2. No pins for communication are needed in the power supply chip of the primary side according to the present invention;
3. The power supply system adopting this kind of control method is not affected by the working mode of the primary controller, and can support the secondary controller to work in the CCM mode;
4. The power supply system adopting this kind of control method communicates in the Reset time, which causes no oscillations between the primary inductance and the parasitic capacitance, and is convenient for the primary controller to detect the communication signal;
5. The power supply system adopting this kind of control method can realize communication by turning on the body diode and the channel of the secondary MOS, and the system is simple.

DETAILED DESCRIPTION OF THE PREFERRED EMBODIMENTS

For a better understanding of the innovative core and the technical effect of the control method for switching power supply of the present invention, embodiments of the technical scheme of the present invention will be described in more details with reference to the accompanying figures.

Figure 4:
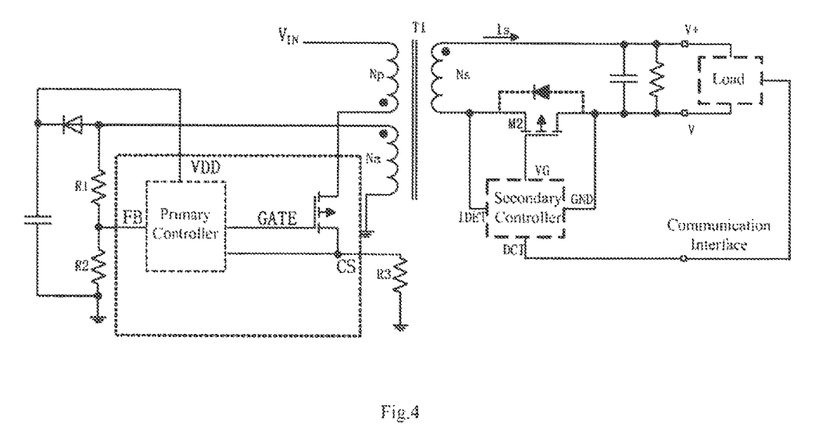
FIG. 4 is an explanatory diagram of the present invention.

As shown in FIG. 4, the control circuit and the control method for the switching power supply comprise a secondary controller and a secondary MOS M2, which are connected between the secondary winding of the transformer and the load, so as to detect the working state of the secondary winding of the transformer and the type of the communication signal transmitted by the load, and to generate a switching pulse signal VG in the Reset time of the on/off cycle according to the type of the communication signal. During the Reset Time, the switching pulse signal VG controls to turn off the secondary MOS M2, thereby forwardly biasing and turning on the body diode; or the switching pulse signal VG controls to turn on the secondary MOS M2, thereby turning on the channel. The turn-on threshold of the body diode of the secondary MOS M2 and the turn-on threshold of the channel are different. Through turning on or turning off the secondary MOS M2, the drain-to-source voltage drop varies transiently. Through the transformer, the transiently varied signal of voltage drop can be coupled to the pin FB of the primary controller connected to the auxiliary winding. If the variation amplitude of the transiently varied signal at the pin FB, which is detected at the Reset time, is greater than the pre-set value ΔVref, it is judged by the primary controller that the signal is a communication signal and the communication signal is recorded. The transmitted communication signals can be parameter information or digital signals. In this messaging mode, the communication between the secondary side and the primary side is realized in the Reset time, so that the switching of the secondary MOS causes no oscillations of the primary side; what's more, no extra devices are required, and the working mode of the primary controller is not limited.

Figure 5:
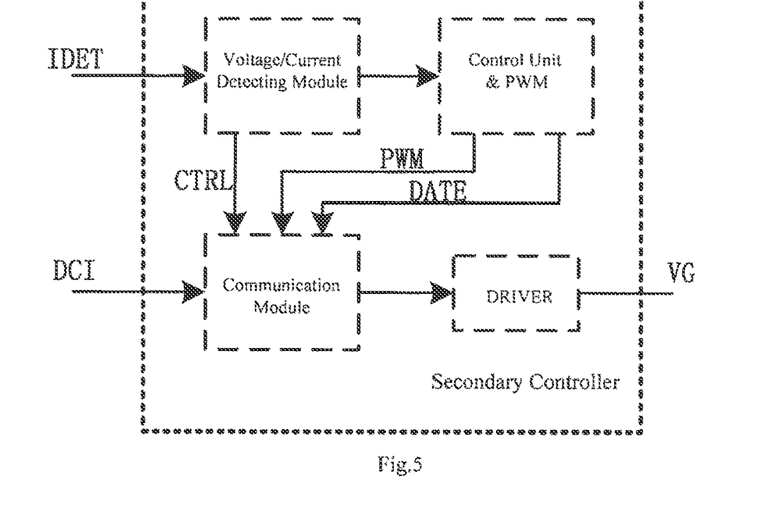
FIG. 5 is a block schematic diagram of the secondary controller of the embodiment shown in FIG. 4.

FIG. 5 is a block schematic diagram of the secondary controller, which comprises a voltage/current detecting module, a control unit & PWM module, a communication module, and a Driver. The voltage/current detecting module is electrically connected with the input port IDET, the control unit & PWM module, and the communication module respectively. The control unit & PWM module is electrically connected with the communication module. The communication module is electrically connected with the input port DCI and the Driver; the Driver is electrically connected with the output port VG and is configured to drive the secondary MOS M2.

Figure 6:
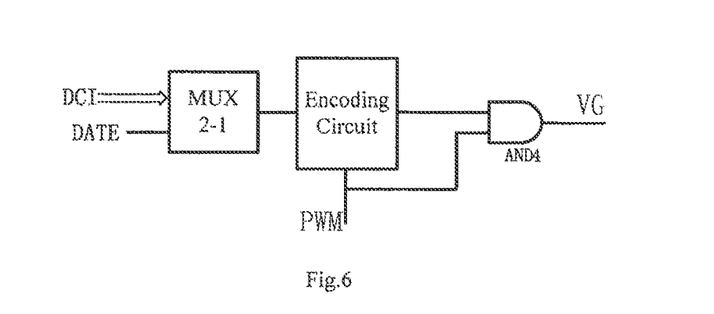
FIG. 6 is a block schematic diagram illustrating one implementation of the communication module of the secondary controller of FIG. 5.

FIG. 6 is a block schematic diagram illustrating one implementation of the communication module of the secondary controller. The communication module is configured to detect the communication signal DCI and the working state signal DATE of the secondary controller, wherein, the signal DATE indicates the working state of the secondary controller, such as an over-temperature state, an output short circuit state, and so on. When one and only one of the two input signals is active, the encoding circuit of the communication module generates a corresponding serial code according to the input signal, and compiles the switching pulse signal VG in the Reset time. In each Reset time, the switching pulse signal VG has only one state: a low level or a high level. When the switching pulse signal VG is a low level, the secondary MOS M2 is turned off; when the secondary winding is demagnetized, the body diode of the secondary MOS M2 is forwardly biased and turned on. When the switching pulse signal VG is a high level, the secondary MOS M2 is turned on; when the secondary winding is demagnetized, the channel of the secondary MOS M2 is turned on. When the secondary winding is demagnetized, the drain-to-source voltage drop is forced to vary transiently by turning on or turning off the secondary MOS M2; through the transformer, the transiently varied signals of voltage drop can be coupled to the pin FB of the primary controller connected to the auxiliary winding. The serial code is transmitted to the pin FB of the primary controller over one or more cycles.

The communication module comprises a multiplexer MUX2-1, an encoding circuit, and an AND gate AND4 configured to perform an AND operation for the output of the encoding circuit and the PWM signal. The multiplexer MUX2-1 is electrically connected with the input signal DCI, the input signal DATE, and the encoding circuit respectively. The encoding circuit is electrically connected with the AND gate AND4 and the input PWM signal respectively. The AND gate AND4 is electrically connected with the input PWM signal and the output signal VG respectively.

Figure 7:
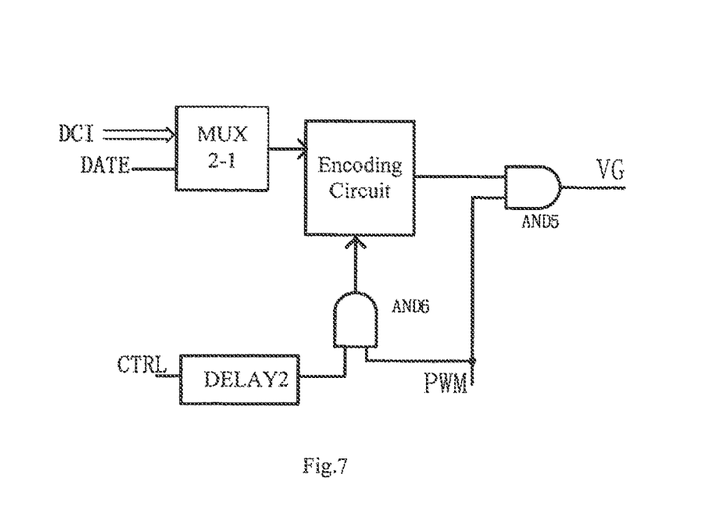
FIG. 7 is a block schematic diagram illustrating another implementation of the communication module of the secondary controller of FIG. 5.

Another implementation of the communication module of the secondary controller is shown in FIG. 7. The communication module is configured to detect the communication signal DCI and the working state signal DATE. When one and only one of the two input signals is active, the encoding circuit of the communication module generates a serial code according to the input signal, and compiles the switching pulse signal VG before or after the sampling signal 1 of the primary controller. In each Reset time, the switching pulse signal VG can have multiple states: a low level and a high level. When the switching pulse signal VG is a low level, the secondary MOS M2 is turned off; when the secondary winding is demagnetized, the body diode of the secondary MOS M2 is forwardly biased and turned on. When the switching pulse signal VG is a high level, the secondary MOS M2 is turned on; when the secondary winding is demagnetized, the channel of the secondary MOS M2 is turned on. The drain-to-source voltage drop is forced to vary transiently by turning on or turning off the secondary MOS M2; through the transformer, the transiently varied signals of the voltage drop can be coupled to the pin FB of the primary controller connected to the auxiliary winding. The serial code is transmitted to the pin FB of the primary controller over one or more cycles.

The communication module comprises a multiplexer MUX2-1, an encoding circuit, a delay unit DELAY2, an AND gate AND5 configured to perform an AND operation for the output of the encoding circuit and the PWM signal, and an AND gate AND6 configured to perform an AND operation for the output of the delay unit DELAY2 and the PWM signal. The multiplexer MUX2-1 is electrically connected with the input signal DCI, the input signal DATE, and the encoding circuit respectively. The encoding circuit is electrically connected with the AND gate AND5 and the AND gate AND6 respectively. The AND gate AND5 is electrically connected with the switching pulse signal VG and the input PWM signal respectively. The delay unit DELAY2 is electrically connected with the input signal CTRL and the AND gate AND6 respectively. The AND gate AND6 is electrically connected with the input PWM signal.

Figure 8:
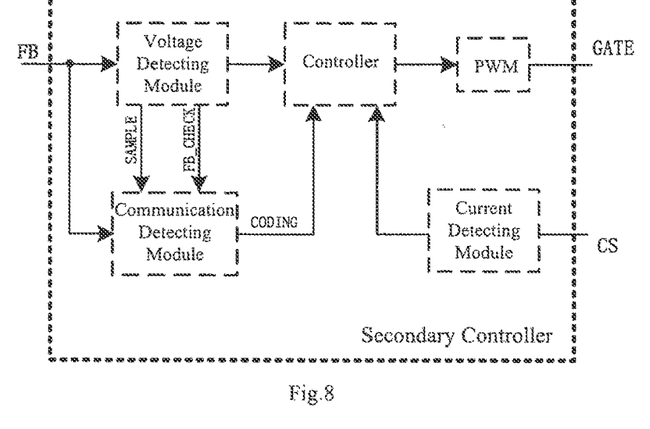
FIG. 8 is a block schematic diagram of the primary controller of the embodiment shown in FIG. 4.

FIG. 8 is a block schematic diagram of the primary controller, which comprises a voltage detecting module, a controller, a PWM module, a current detecting module, and a communication detecting module. The communication detecting module is electrically connected with the pin FB, the voltage detecting module, and the controller respectively. The voltage detecting module is electrically connected with the controller and the pin FB respectively. The current detecting module is electrically connected with the controller and the input port CS respectively. The PWM module is electrically connected with the controller and the output port GATE.

Figure 9:
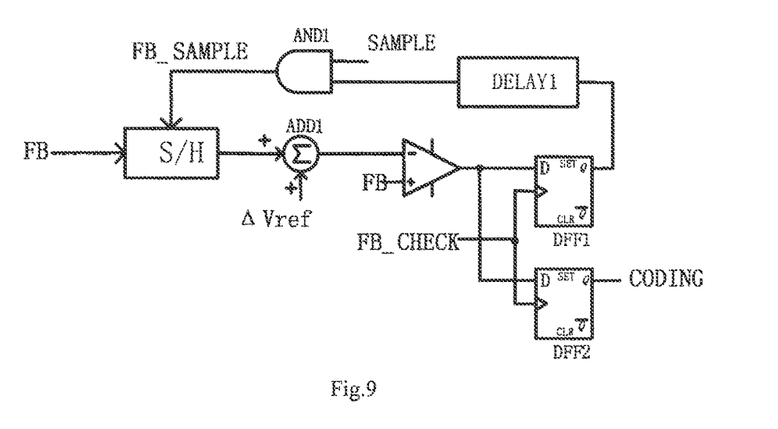
FIG. 9 is a block schematic diagram illustrating one implementation of the communication module of the primary controller of FIG. 8.

FIG. 9 is a block schematic diagram illustrating one implementation of the communication module of the primary controller. In the Reset time, the variation amplitude of the transiently varied signals at the pin FB between two adjacent on/off cycles is detected. When the variation amplitude of the transiently varied signal at the pin FB is greater than or equals to the pre-set value $\Delta$Vref, the communication detecting module sets the output signal CODING to be a high level. When the variation amplitude of the transiently varied signal at the pin FB is less than the pre-set value $\Delta$Vref, the communication detecting module sets the output signal CODING to be a low level. The output signal CODING is namely the switching pulse signal VG generated by the secondary controller, thereby realizing the communication between the primary side and the secondary side.

The communication detecting module comprises a sample-and-hold module S/H, an adder ADD1, a comparator, a first trigger DFF1, a second trigger DFF2, a delay unit DELAY1, and an AND gate configured to perform an AND operation for the signal SAMPLE and the output signal of the delay unit DELAY1. The sample-and-hold module S/H is electrically connected with the adder ADD1, the AND gate configured to perform an AND operation for the signal SAMPLE and the output signal of the delay unit DELAY1, and the input pin FB respectively. The adder ADD1 is electrically connected with the comparator and the pre-set threshold reference $\Delta$Vref. The comparator is electrically connected with the input pin FB, the first trigger DFF1, and the second trigger DFF2 respectively. The first trigger DFF1 is electrically connected with the input signal FB_CHECK and the delay unit DELAY1 respectively. The trigger DFF2 is electrically connected with the input signal FB_CHECK and the output signal CODING respectively. The delay unit DELAY1 is electrically connected with the AND gate AND1. The AND gate AND1 is electrically connected with the input signal SAMPLE.

Figure 10:
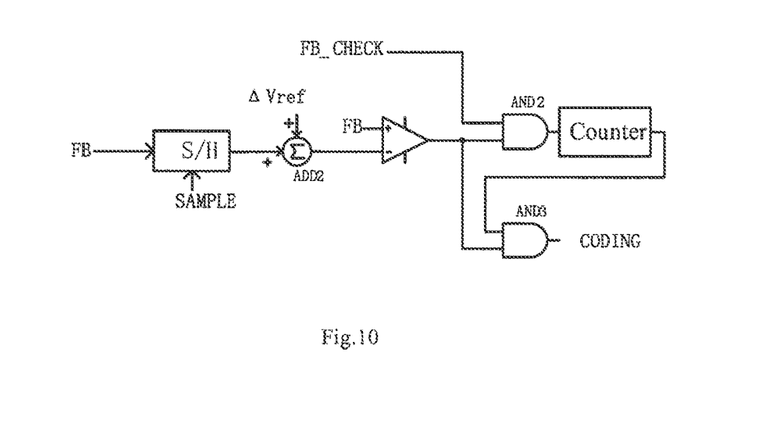
FIG. 10 is a block schematic diagram illustrating another one implementation of the communication module of the primary controller of FIG. 8.

FIG. 10 is a block schematic diagram illustrating another one implementation of the communication module of the primary controller. In the Reset time, the variation amplitude of the transiently varied signals at the pin FB before and after the sampling signal of primary controller is detected. When the variation amplitude of the transiently varied signals at the pin FB is greater than or equals to the pre-set value $\Delta$Verf, the communication detecting module sets the output signal CODING to be a high level. When the variation amplitude of the transiently varied signals at the pin FB is less than the pre-set value $\Delta$Vref, the communication detecting module sets the output signal CODING to be a low level. The output signal CODING is namely the switching pulse signal VG generated by the secondary controller, thereby realizing the communication between the primary side and the secondary side.

The communication detecting module comprises a sample-and-hold module S/H, an adder ADD2, a comparator, an AND gate AND2 configured to perform an AND operation for the output signal of the comparator and the logic signal FB_CHECK, a counter, an AND gate AND3 configured to perform an AND operation for the output signal of the comparator and the output logical signal of the counter. The sample-and-hold module S/H is electrically connected with the adder ADD2, the input signal SAMPLE, and the input pin FB respectively. The adder ADD1 is electrically connected with the comparator and the pre-set threshold reference ΔVref respectively. The comparator is electrically connected with the input pin FB, the input end of the AND gate AND2 and the input end of the AND gate AND3 respectively. The AND gate AND2 is electrically connected with the input signal FB_CHECK. The comparator is electrically connected with the AND gate AND2 and the AND gate AND3 respectively. The AND gate AND3 is electrically connected with the output signal CODING.

Figure 11:
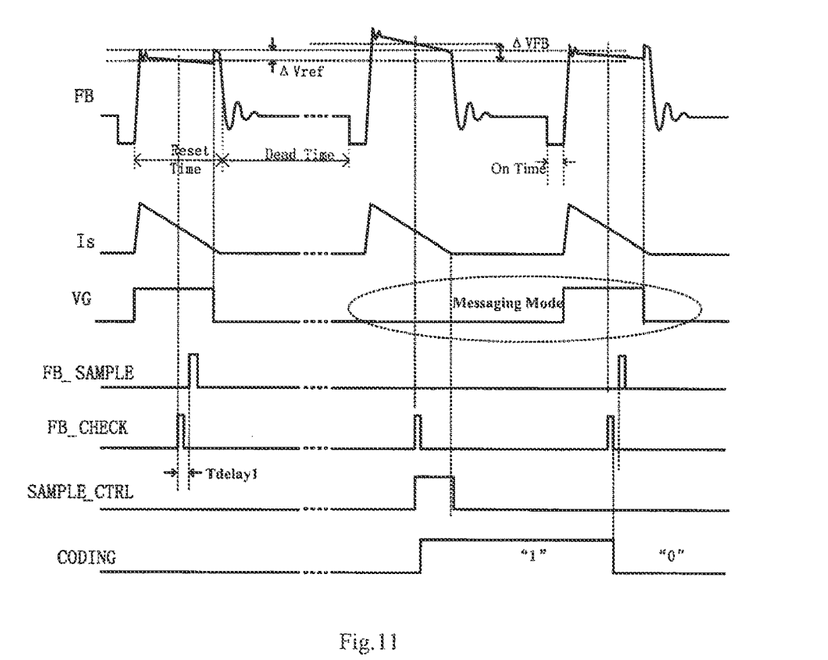
FIG. 11 shows working waveforms in the messaging mode of the embodiment shown in FIG. 6 and FIG. 9.

FIG. 11 shows waveforms in the messaging mode according to the embodiment shown in FIG. 6 and FIG. 9. There is only one communication in one on/off cycle. The on/off cycle of the switching power supply is divided into three stages: 1. the On Time, in which the primary side of the transformer stores energy; 2. the Reset Time, in which the secondary side of the transformer transmits energy to the output, the channel of the secondary MOS M2 is turned on, or the body diode of the secondary MOS M2 is turned on; 3. the Dead Time, in which the primary side oscillates. The messaging mode of the present invention is realized in the Reset Time. In normal working mode and in the Reset Time, the secondary controller sets the pulse signal VG to be a high level; the channel of the secondary MOS M2 is turned on; the drain-to-source voltage drop of the secondary MOS is about 0V; the value VFB detected at the pin FB of the primary controller is VFB=VOUT/n, wherein n is the ratio of the number of turns of the auxiliary winding to the number of turns of the secondary winding.

The primary controller holds the value VFB, so as to detect the transiently varied value at the pin FB in the next cycle. The primary controller generates PWM waveforms according to the value VFB in the current cycle.

When the secondary controller sets the pulse signal VG to be a low level in the Reset Time, the body diode of the secondary MOS M2 is turned on; the drain-to-source voltage drop of the secondary MOS is the forward turn-on threshold voltage of the diode, such as 0.7V; at this instant, the value VFB detected at the pin FB of the secondary controller is VFB=(VOUT+0.7)/n, wherein n is the ratio of the number of turns of the auxiliary winding to the number of turns of the secondary winding.

If the channel is turned on in the last cycle of the secondary controller, and the body diode is turned on in the current cycle, the value VFB detected at the pin FB of the primary controller will vary transiently by 0.7/n, wherein 0.7/n is greater than ΔVref. If the transiently varied value detected at the pin FB of the primary controller is greater than ΔVref, the output signal CODING is set to be a high level. The high level and the low level of the pulse signal VG set by the secondary controller are recorded by CODING so as to realize communication. In other circumstances, the CODING is set to be a low level. When the primary controller detects a transient variation, the primary controller shields the control signal VFB_SAMPLE of the sample-and-hold module; the primary controller remains continues to work in the state as that in the last cycle, thereby avoiding variation of VFB caused by communication which will affect the normal operation of the chip.

Figure 12:
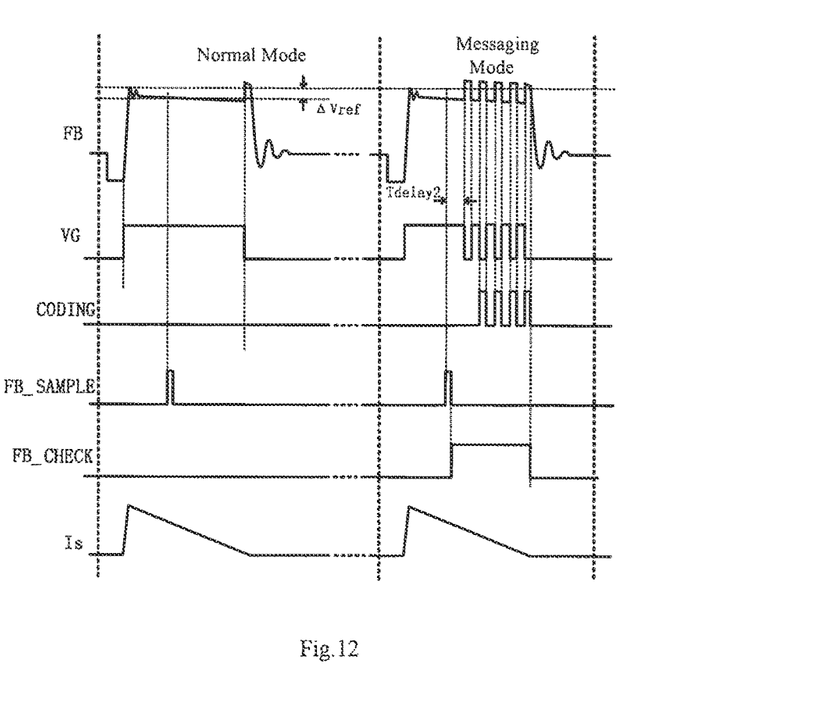
FIG. 12 shows working waveforms in one messaging mode of the embodiment shown in FIG. 7 and FIG. 10.

FIG. 12 shows waveforms in one messaging mode according to the embodiment shown in FIG. 7 and FIG. 10. This kind of messaging mode is realized in a time segment of the Reset Time, but not in the whole Reset Time. As shown in the FIG. 12, the communication interval starts from the falling edge of the signal FB_SAMPLE and ends at the endpoint of the Reset Time. The signal CTRL of the secondary controller and the signal FB_SAMPLE of the primary controller have identical mechanism and are both generated at the middle point of the Reset Time of the last cycle or at another fixed point, so the waveform of the signal FB_SAMPLE and the waveform of the signal CTRL are identical. In order that the communication signal can be transmitted after the falling edge of the signal FB_SAMPLE, the signal CTRL of the secondary controller enables the signal VG to be compiled after a delay Tdelay2 of the high level. The duty ratios of the PWM signals generated by the primary controller are different, and the lengths of the communication intervals are different, so the communication signal can be transmitted to the primary side over one cycle or more cycles. The primary controller cascades the detected communication signals to generate a complete communication signal, thereby actuating corresponding actions according to the content of the signal.

Figure 13:
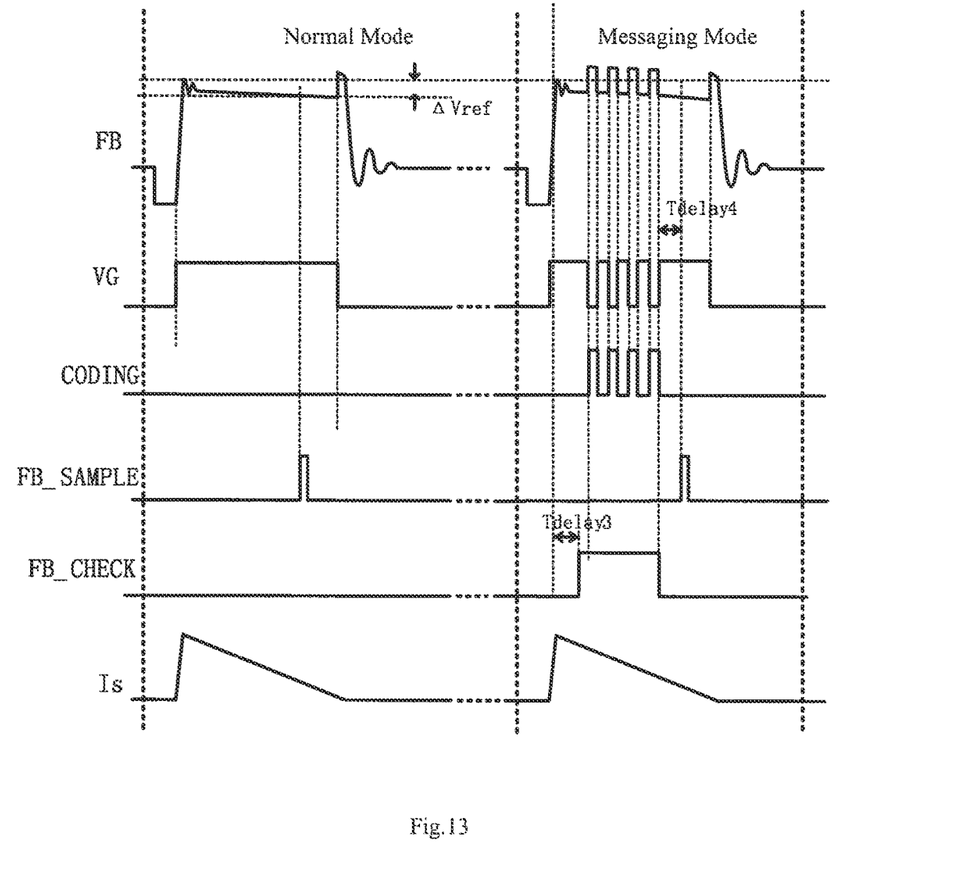
FIG. 13 shows working waveforms in another messaging mode according to the embodiment shown in FIG. 7 and FIG. 10.

FIG. 13 shows waveforms in the other messaging mode according to another embodiment shown in FIG. 7 and FIG. 10. This kind of messaging mode is realized in a time segment of the Reset Time. As shown in the FIG. 13, the communication interval starts after a delay Tdelay3 of the starting point of the Reset Time and ends at the falling edge of the signal FB_CHECK. The signal CTRL of the secondary controller and the signal FB_SAMPLE of the primary controller have identical mechanism and are both generated at the middle point of the Reset Time of the last cycle or at another fixed point, so the waveform of the signal FB_SAMPLE and the waveform of the signal CTRL are identical. In order that the primary controller samples normally after the communication signal ends, the value VFB is allowed to be sampled normally after a delay Tdealy4 of the falling edge of the signal FB_SAMPLE of the primary controller. The duty ratios of the PWM signals generated by the secondary controller are different, and the lengths of the communication intervals are different, so the communication signal can be transmitted to the primary side over one cycle or more cycles. The primary controller cascades the detected communication signals to generate an accurate communication signal, thereby actuating corresponding actions according to the content of the signal.

It will be understood by those skilled in the art that the preferred embodiments described above are not restricted and that various modifications and improvements may be made based on the principles of the present invention without departing from the scope of the invention.

What is claimed is:

1. A control method for switching power supply, the switching power supply comprises a primary side controller, a load, and a transformer, and a secondary side controller and a secondary side MOS transistor (M2) are connected between the load and a secondary side winding of the transformer; the secondary side controller comprises a voltage/current detecting module, a control unit & PWM module, a communication module, and a Driver; the voltage/current detecting module is electrically connected with an input port IDET, the control unit & PWM module, and the communication module respectively; the control unit & PWM module is electrically connected with the communication module; the communication module is electrically connected with an input port DCI and the Driver; the Driver is electrically connected with an output port VG; the method comprising:

at an end of the secondary side winding of the transformer, detecting, by the secondary side controller, a working state of the secondary side winding of the transformer and a type of a communication signal transmitted by the load in real time, and generating a switching pulse signal VG in a Reset Time interval of an on/off cycle according to the type of the communication signal; during the Reset Time interval of an on/off cycle, controlling, by the switching pulse signal VG, to turn on or turn off the secondary side MOS transistor (M2), and forcing a drain-to-source voltage drop of the secondary side MOS transistor (M2) to vary transiently; through an auxiliary winding of the transformer, coupling transiently varied signals of the voltage drop to a pin feedback (FB) of the primary side controller;

at an end of a primary side winding and the auxiliary winding of the transformer, detecting, by the primary side controller, a variation amplitude of the transiently varied signal of the voltage drop at the pin FB in the Reset Time interval; if the variation amplitude of the transiently varied signal is greater than or equal to a pre-set value ΔVref, it is judged by the primary side controller that the signal is a communication signal, and the communication signal is recorded, and a corresponding action according to information of the communication signal is actuated; and detecting a communication signal at the port DCI and a working state signal DATE of the secondary side controller by the communication module; when one and only one of two input signals is active, the communication module generating a corresponding serial code according to the input signal, and compiling the switching pulse signal VG in the Reset time interval; the serial code being transmitted to the pin FB of the primary side controller over one or more cycles.

2. The control method for switching power supply according to claim 1, wherein, the communication module comprises a multiplexer MUX2-1, an encoding circuit, and an AND gate AND4 configured to perform an AND operation for an output of the encoding circuit and a PWM signal; the multiplexer MUX2-1 is electrically connected with the input signal at the port DCI, the input signal DATE, and the encoding circuit respectively; the encoding circuit is electrically connected with the AND gate AND4 and the input PWM signal respectively; the AND gate AND4 is electrically connected with the input PWM signal and the switching pulse signal VG respectively; in each Reset time interval, the compiled switching pulse signal VG has only one state: a low level or a high level; when the switching pulse signal VG is a low level, the secondary side MOS transistor (M2) is turned off; when the secondary side winding is demagnetized, a body diode of the secondary side MOS transistor (M2) is forwardly biased and turned on; when the switching pulse signal VG is a high level, the secondary side MOS transistor (M2) is turned on; when the secondary side winding is demagnetized, a channel of the secondary side MOS transistor (M2) is turned on; the drain-to-source voltage drop of the secondary side MOS transistor (M2) is forced to vary transiently by turning on or turning off the secondary side MOS transistor (M2) in the Reset Time interval.

3. The control method for switching power supply according to claim 1, wherein, the communication module comprises a multiplexer MUX2-1, an encoding circuit, a delay unit DELAY2, an AND gate AND5 configured to perform an AND operation for an output of the encoding circuit and a PWM signal, and an AND gate AND6 configured to perform an AND operation for an output of the delay unit DELAY2 and the PWM signal; the multiplexer MUX2-1 is electrically connected with the input signal at the port DCI, the input signal DATE, and the encoding circuit respectively; the encoding circuit is electrically connected with the AND gate AND5 and the AND gate AND6 respectively; the AND gate AND5 is electrically connected with the switching pulse signal VG and the input PWM signal respectively; the delay unit DELAY2 is electrically connected with an input signal CTRL and the AND gate AND6; the AND gate AND6 is electrically connected with the input PWM signal; in each Reset time interval, the compiled switching pulse signal VG comprises multiple states: a low level and a high level; when the switching pulse signal VG is a low level, the secondary side MOS transistor (M2) is turned off; when the secondary side winding is demagnetized, a body diode of the secondary side MOS transistor (M2) is forwardly biased and turned on; when the switching pulse signal VG is a high level, the secondary side MOS transistor (M2) is turned on; when the secondary side winding is demagnetized, a channel of the secondary side MOS transistor (M2) is turned on; the drain-to-source voltage drop of the secondary side MOS transistor (M2) is forced to vary transiently by turning on or turning off the secondary side MOS transistor (M2) in the Reset Time interval.

4. The control method for switching power supply according to claim 1, wherein, the primary side controller comprises a voltage detecting module, a controller, a PWM module, a current detecting module, and a communication detecting module; the communication detecting module is electrically connected with the pin FB, the voltage detecting module, and the controller respectively; the voltage detecting module is electrically connected with the controller and the pin FB respectively; the current detecting module is electrically connected with the controller and the input port CS respectively; the PWM module is electrically connected with the controller and the output port GATE; in the Reset time interval, the communication detecting module detects the variation amplitude of the transiently varied signal at the pin FB between two adjacent on/off cycles; when the variation amplitude of the transiently varied signal at the pin FB is greater than or equal to the pre-set value ΔVref, the communication detecting module sets an output signal CODING to be a high level; when the variation amplitude of the transiently varied signal is less than the pre-set value ΔVref, the communication detecting module sets the output signal CODING to be a low level; and the output signal CODING corresponds with the switching pulse signal VG so as to realize communication between a primary side and a secondary side.

5. The control method for switching power supply according to claim 4, wherein, the communication detecting module comprises a sample-and-hold module S/H, an adder ADD1, a comparator, a first trigger DFF1, a second trigger DFF2, a delay unit DELAY1, and an AND gate AND1 configured to perform an AND operation for a Sample signal and an output signal of the delay unit DELAY1; the sample-and-hold module S/H is electrically connected with the adder ADD1,the AND gate AND1, and the input pin FB respectively; the adder ADD1 is electrically connected with the comparator and the pre-set threshold reference ΔVref; the comparator is electrically connected with the input pin FB, the first trigger DFF1, and the second trigger DFF2 respectively; the first trigger DFF1 is electrically connected with an input signal FB_CHECK and the delay unit DELAY1 respectively; the trigger DFF2 is electrically connected with the input signal FB_CHECK and an output signal CODING respectively.

6. The control method for switching power supply according to claim 4, wherein, the communication detecting module comprises a sample-and-hold module S/H, an adder ADD2, a comparator, an AND gate AND2 configured to perform an AND operation for an output signal of the comparator and a logic signal FB_CHECK, a counter, an AND gate AND3 configured to perform an AND operation for the output signal of the comparator and the output logical signal of the counter; the sample-and-hold module S/H is electrically connected with the adder ADD2, an input signal SAMPLE, and the input pin FB respectively; the adder ADD1 is electrically connected with the comparator and the pre-set threshold reference ΔVref respectively; the comparator is electrically connected with the input pin FB, an input end of the AND gate AND2 and an input end of the AND gate AND3 respectively; the AND gate AND2 is electrically connected with the input signal FB _CHECK; the comparator is electrically connected with the AND gate AND2 and the AND gate AND3 respectively; and the AND gate AND3 is electrically connected with an output signal CODING.

7. A control circuit for switching power supply, comprising a primary side controller, a load, and a transformer, the control circuit comprises a secondary side controller and a secondary side MOS transistor (M2) the secondary side controller and the secondary side MOS transistor (M2) are connected between the load and a secondary side winding of the transformer; the secondary side controller comprises a voltage/current detecting module, a control unit & PWM module, a communication module, and a Driver; the voltage/current detecting module is electrically connected with an input port IDET, the control unit & PWM module, and the communication module respectively; the control unit & PWM module is electrically connected with the communication module; the communication module is electrically connected with an input port DCI and the Driver; the Driver is electrically connected with an output port VG;

wherein at an end of the secondary side winding of the transformer, the secondary side controller is configured to detect a working state of the secondary side winding of the transformer in real time and a type of a communication signal transmitted by the load, and generate a switching pulse signal VG in a Reset Time interval of an on/off cycle according to the type of the communication signal; during the Reset Time interval of an on/off cycle, the switching pulse signal VG controls to turn on or turn off the secondary side MOS transistor (M2), and forces a drain-to-source voltage drop of the secondary side MOS transistor (M2) varies transiently; through an auxiliary winding of the transformer, transiently varied signals of the voltage drop are coupled to a pin feedback (FB) of the primary side controller;

at an end of a primary side winding and the auxiliary winding of the transformer, the primary side controller is configured to detect a variation amplitude of the transiently varied signal of the voltage drop at the pin FB in the Reset Time interval; if the variation amplitude of the transiently varied signal is greater than or equal to a pre-set value ΔVref, it is judged by the primary side controller that the signal is a communication signal, and the communication signal is recorded, and a corresponding action according to information of the communication signal is actuated; and the secondary side controller comprises a voltage/current detecting module, a control unit & PWM module, a communication module, and a Driver; the voltage/current detecting module is electrically connected with an input port IDET, the control unit & PWM module, and the communication module respectively; the control unit & PWM module is electrically connected with the communication module; the communication module is electrically connected with an input port DCI and the Driver; the Driver is electrically connected with an output port VG;

wherein the communication module is configured to detect a communication signal at the port DCI and a working state signal DATE of the secondary side controller; when one and only one of two input signals is active, the communication module generates a corresponding serial code according to the input signal, and compiles the switching pulse signal VG in the Reset time interval; the serial code is transmitted to the pin FB of the primary side controller over one or more cycles.

8. The control circuit for switching power supply according to claim 7, wherein, the communication module comprises a multiplexer MUX2-1, an encoding circuit, and an AND gate AND4 configured to perform an AND operation for an output of the encoding circuit and a PWM signal; the multiplexer MUX2-1 is electrically connected with the input signal at the port DCI, the input signal DATE, and the encoding circuit respectively; the encoding circuit is electrically connected with the AND gate AND4 and the input PWM signal respectively; the AND gate AND4 is electrically connected with the input PWM signal and the switching pulse signal VG respectively; in each Reset time interval, the compiled switching pulse signal VG has only one state: a low level or a high level; when the switching pulse signal VG is a low level, the secondary side MOS transistor (M2) is turned off; when the secondary side winding is demagnetized, a body diode of the secondary side MOS transistor (M2) is forwardly biased and turned on; when the switching pulse signal VG is a high level, the secondary side MOS transistor (M2) is turned on; when the secondary side winding is demagnetized, a channel of the secondary side MOS transistor (M2) is turned on; the drain-to-source voltage drop of the secondary side MOS transistor (M2) is forced to vary transiently by turning on or turning off the secondary side MOS transistor (M2) in the Reset Time interval.

9. The control circuit for switching power supply according to claim 7, wherein, the communication module comprises a multiplexer MUX2-1, an encoding circuit, a delay unit DELAY2, an AND gate AND5 configured to perform an AND operation for an output of the encoding circuit and a PWM signal, and an AND gate AND6 configured to perform an AND operation for an output of the delay unit DELAY2 and the PWM signal; the multiplexer MUX2-1 is electrically connected with the input signal at the port DCI, the input signal DATE, and the encoding circuit respectively; the encoding circuit is electrically connected with the AND gate AND5 and the AND gate AND6 respectively; the AND gate AND5 is electrically connected with the switching pulse signal VG and the input PWM signal respectively; the delay unit DELAY2 is electrically connected with an input signal CTRL and the AND gate AND6; the AND gate AND6 is electrically connected with the input PWM signal; in each Reset time interval, the compiled switching pulse signal VG comprises multiple states: a low level and a high level; when the switching pulse signal VG is a low level, the secondary side MOS transistor (M2) is turned off; when the secondary side winding is demagnetized, a body diode of the secondary side MOS transistor (M2) is forwardly biased and turned on; when the switching pulse signal VG is a high level, the secondary side MOS transistor (M2) is turned on; when the secondary side winding is demagnetized, a channel of the secondary side MOS transistor (M2) is turned on; the drain-to-source voltage drop of the secondary side MOS transistor (M2) is forced to vary transiently by turning on or turning off the secondary side MOS transistor (M2) in the Reset Time interval.

10. The control circuit for switching power supply according to claim 7, wherein, the primary side controller comprises a voltage detecting module, a controller, a PWM module, a current detecting module, and a communication detecting module; the communication detecting module is electrically connected with the pin FB, the voltage detecting module, and the controller respectively; the voltage detecting module is electrically connected with the controller and the pin FB respectively; the current detecting module is electrically connected with the controller and the input port CS respectively; the PWM module is electrically connected with the controller and the output port GATE; in the Reset time interval, the communication detecting module detects the variation amplitude of the transiently varied signal at the pin FB between two adjacent on/off cycles; when the variation amplitude of the transiently varied signal at the pin FB is greater than or equal to the pre-set value $\Delta Vref$, the communication detecting module sets an output signal CODING to be a high level; when the variation amplitude of the transiently varied signal is less than the pre-set value $\Delta Vref$, the communication detecting module sets the output signal CODING to be a low level; and the output signal CODING corresponds with the switching pulse signal VG so as to realize communication between a primary side and a secondary side.

11. The control circuit for switching power supply according to claim 10, wherein, the communication detecting module comprises a sample-and-hold module S/H, an adder ADD1, a comparator, a first trigger DFF1, a second trigger DFF2, a delay unit DELAY1, and an AND gate AND1 configured to perform an AND operation for a Sample signal and an output signal of the delay unit DELAY1; the sample-and-hold module S/H is electrically connected with the adder ADD1, the AND gate AND1, and the input pin FB respectively; the adder ADD1 is electrically connected with the comparator and the pre-set threshold reference $\Delta Vref$; the comparator is electrically connected with the input pin FB, the first trigger DFF1, and the second trigger DFF2 respectively; the first trigger DFF1 is electrically connected with an input signal FB_CHECK and the delay unit DELAY1 respectively; the trigger DFF2 is electrically connected with the input signal FB_CHECK and an output signal CODING respectively.

12. The control circuit for switching power supply according to claim 10, wherein, the communication detecting module comprises a sample-and-hold module S/H, an adder ADD2, a comparator, an AND gate AND2 configured to perform an AND operation for an output signal of the comparator and a logic signal FB_CHECK, a counter, an AND gate AND3 configured to perform an AND operation for the output signal of the comparator and the output logical signal of the counter; the sample-and-hold module S/H is electrically connected with the adder ADD2, an input signal SAMPLE, and the input pin FB respectively; the adder ADD1 is electrically connected with the comparator and the pre-set threshold reference $\Delta Vref$ respectively; the comparator is electrically connected with the input pin FB, an input end of the AND gate AND2 and an input end of the AND gate AND3 respectively; the AND gate AND2 is electrically connected with the input signal FB_CHECK; the comparator is electrically connected with the AND gate AND2 and the AND gate AND3 respectively; and the AND gate AND3 is electrically connected with an output signal CODING.

* * * * *